(12) United States Patent
Gara et al.

(10) Patent No.: US 8,108,738 B2
(45) Date of Patent: Jan. 31, 2012

(54) DATA EYE MONITOR METHOD AND APPARATUS

(75) Inventors: Alan G. Gara, Mount Kisco, NY (US); James A. Marcella, Rochester, MN (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 11/768,810

(22) Filed: Jun. 26, 2007

(65) Prior Publication Data
US 2009/0006730 A1    Jan. 1, 2009

(51) Int. Cl.
*G06K 5/04* (2006.01)
*G11B 5/00* (2006.01)
*G11B 20/20* (2006.01)

(52) U.S. Cl. .................. 714/700; 711/167; 375/355
(58) Field of Classification Search .................. 714/700; 711/167; 375/355
See application file for complete search history.

(56) References Cited

U.S. PATENT DOCUMENTS

| | | |
|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barkey et al. |
| 5,890,211 A | 3/1999 | Sokolov et al. |
| 5,917,828 A | 6/1999 | Thompson |
| 6,023,732 A | 2/2000 | Moh et al. |
| 6,061,511 A | 5/2000 | Marantz et al. |

(Continued)

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atEIGc-11603&hilite+00304337 Date Not Known.

(Continued)

*Primary Examiner* — M. Mujtaba K Chaudry
(74) *Attorney, Agent, or Firm* — Scully, Scott, Murphy and Presser, P.C.; Daniel P. Morris, Esq.

(57) ABSTRACT

An apparatus and method for providing a data eye monitor. The data eye monitor apparatus utilizes an inverter/latch string circuit and a set of latches to save the data eye for providing an infinite persistent data eye. In operation, incoming read data signals are adjusted in the first stage individually and latched to provide the read data to the requesting unit. The data is also simultaneously fed into a balanced XOR tree to combine the transitions of all incoming read data signals into a single signal. This signal is passed along a delay chain and tapped at constant intervals. The tap points are fed into latches, capturing the transitions at a delay element interval resolution. Using XORs, differences between adjacent taps and therefore transitions are detected. The eye is defined by segments that show no transitions over a series of samples. The eye size and position can be used to readjust the delay of incoming signals and/or to control environment parameters like voltage, clock speed and temperature.

22 Claims, 3 Drawing Sheets

U.S. PATENT DOCUMENTS

| | | | |
|---|---|---|---|
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,430,696 | B1 * | 8/2002 | Keeth .................. 713/503 |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,062,625 | B1 * | 6/2006 | Shrader et al. .................. 711/167 |
| 7,065,594 | B2 | 6/2006 | Ripy et al. |
| 7,143,219 | B1 | 11/2006 | Chaudhari et al. |
| 7,165,185 | B2 | 1/2007 | Li et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0021616 | A1 * | 2/2002 | Keeth et al. .................. 365/233 |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna-Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0182595 | A1 * | 9/2003 | Carnevale et al. .................. 714/25 |
| 2003/0188053 | A1 | 10/2003 | Tsai |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0114698 | A1 * | 6/2004 | Barrett et al. .................. 375/355 |
| 2004/0179716 | A1 * | 9/2004 | Tafuku et al. .................. 382/103 |
| 2004/0210694 | A1 | 10/2004 | Shenderovich |
| 2004/0243739 | A1 | 12/2004 | Spencer |
| 2005/0001662 | A1 * | 1/2005 | Kizer et al. .................. 327/156 |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

\* cited by examiner

DATA EYE MONITOR METHOD AND APPARATUS

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,812, for "A CONFIGURABLE MEMORY SYSTEM AND METHOD FOR PROVIDING ATOMIC COUNTING OPERATIONS IN. A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE CO CATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF

BACKGROUND OF THE INVENTION

1. Field of the Invention

The present invention generally relates to computer systems having DDR SDRAM memory and, particularly to a novel apparatus and method for monitoring the DDR dynamic eye and improving the memory interface based on the data eye monitoring.

2. Description of the Prior Art

With the advent of high speed external memories that employ a source synchronous interface it has become difficult to extract data from the interface. Today DDR SDRAMs deliver data and strobe that are edge aligned. In order to capture the data, the strobe signal is delayed to the midpoint of the data and then used as a clock to latch the data into storage elements (i.e., the latches on a chip). With higher memory interface speeds, the amount of data eye available to move the strobe into is shrinking. For analysis and for strobe centering it would be advantageous to be able to determine the data eye internal to the chip.

U.S. Pat. No. 7,165,185 discloses a DDR II write data capture calibration tool that controls the rate with which data is input to a DRAM relative to an external DRAM clock. In the embodiments described, a known data pattern is used at each of the data inputs and the data is delayed across a clock. The data is delayed such that the predetermined pattern is recognizable and further delay adjustments are made until the predetermined pattern is no longer recognized indicating that an edge of the eye of the data is near a clocking edge of the clocking signal. The data delay is further adjusted to situate the position of the clock edge near the center of the data eye.

It would thus be highly desirable to provide an improved method for monitoring the DDR memory data eye and adjusting the strobe location to improve the memory interface.

It would be further highly desirable to provide a system and method for providing an infinite persistant data eye wherein the strobe signal may be continuously adjusted in real-time operation to ensure accurate latching of the data signals at the input of a receiving data latch circuit throughout its operation.

SUMMARY OF THE INVENTION

A novel data eye generator and data memory interface adjustment technique based on the data eye is provided.

In one aspect of the present invention, an infinite persistent data eye is generated. A two-phase process is provided whereby in a first phase, incoming read data signals are adjusted individually and latched to provide the read data to a requesting unit. The read data is also fed into a balanced XOR tree to combine the transitions of all incoming read data signals into a single signal. This signal is passed along a delay chain and tapped at constant intervals. The tap points are fed into latches, capturing the transitions at a delay element interval resolution. Using XORs, differences between adjacent taps and therefore transitions are detected. The eye is defined by the segments that show no transitions over a series of samples. The eye size and position can be used to readjust the delay of incoming signals and/or to control environment parameters like voltage, clock speed and temperature.

That is, once the width of the data eye is known various actions can be taken to improve the memory interface (i.e. strobe centering can be adjusted). Actions can be performed by hardware or by a combination of software and hardware. Using this method the data eye can be monitored continuously during actual read operations and not simply during a diagnostic or power on time.

Thus, in accordance with one embodiment of the invention, there is provided a method and apparatus for tracking a data eye window of a capture device receiving data signals to be captured from a memory storage device, the signals including a strobe signal for latching a plurality of data bit signals at the capture device, the apparatus comprising:

a balanced tree network comprising a plurality of inputs each for receiving one of a respective plurality of the data bit signals input from a memory storage device in coordination with the strobe signal, and generating an output signal associated with the plurality of data signals;

a tapped inverter chain receiving the output signal for generating a persistent data eye at tap outputs of the inverter chain, the persistent data eye used to adjust the strobe signal to improve data eye centering of the capture device.

Further to this aspect of the invention, the balanced tree network is an XOR network, and the output signal comprises a parity signal associated with the plurality of data signals in a memory storage transfer cycle.

Still further, the apparatus comprises an signal adjust means for first receiving said plurality of data bit signals and aligning one or more said data bit signals of said plurality of data bit signals according to a slowest received data bit signal prior to input to said balanced tree network.

Moreover, further to this aspect of the invention, the tapped inverter chain comprises:
  a serial connection of inverter devices, each providing a fixed delay time interval, and providing a respective output signal at each the tap outputs;
  a respective latch device associated with each inverter device for latching a respective output signal at each tap output; and,
  a comparison device associated with each inverter for receiving a respective latched tap output signal and receiving an latched output signal of a next adjacent inverter in the chain, and determining at each respective tap output presence or absence of a transition at a delay element interval resolution.

The apparatus further comprises: a means associated with each respective comparison device for latching an output of each respective said comparison device, said persistent data eye represented as a series of latched data bits output from said tapped inverter chain.

Further to this embodiment, each tap along the tapped inverter chain represents a time accumulation for building the persistent data eye, a location of a transition present along the tapped inverter chain indicating an edge of the data eye window. Movement of a location of a transition along the tapped inverter chain indicates a persistent data eye time shift relative to a centered data eye position, the apparatus further comprising means for adjusting the strobe signal in accordance with the time shift.

In a further embodiment, a method for tracking a data eye window of a capture device receiving a plurality of signals to be captured from a memory storage device, the signals including a strobe signal for latching a plurality of data bit signals at the capture device, the method comprising:
  receiving, at a balanced tree network, each of a plurality of data bit signals comprising data bits input from a memory storage device, and generating an output signal associated with the plurality of data signals;
  implementing a tapped inverter chain responsive to the output signal for generating a persistent data eye at tap outputs; and,
  adjusting the strobe signal to improve data eye centering in accordance with the persistent data eye.

Further to this aspect of the invention, there is performed, prior to said receiving step, a step of aligning one or more said data bit signals of said plurality of data bit signals according to a slowest received data bit signal prior to input to said balanced tree network.

Moreover, as the tapped inverter chain comprises a serial connection of inverter devices, each providing a fixed delay time interval, and each providing a respective output signal at each the tap outputs, the method further comprises:
  latching, at a respective latch device associated with each inverter device, a respective output signal at each tap output; and,
  comparing a respective latched tap output signal and a latched output signal of a next adjacent inverter device in the chain for determining a presence or absence of a transition at a delay element interval resolution.

Furthermore, according to the method there is provided a further step of: latching an output of each respective the comparison device, wherein the persistent data eye represented as a series of latched data bits output from the tapped inverter chain.

Advantageously, while the invention is described in the context of a microprocessor chip adapted receiving data from a DRAM memory device, the invention can be broadly applied to many other digital integrated circuits, computing and memory systems having a high-speed source synchronous interface.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
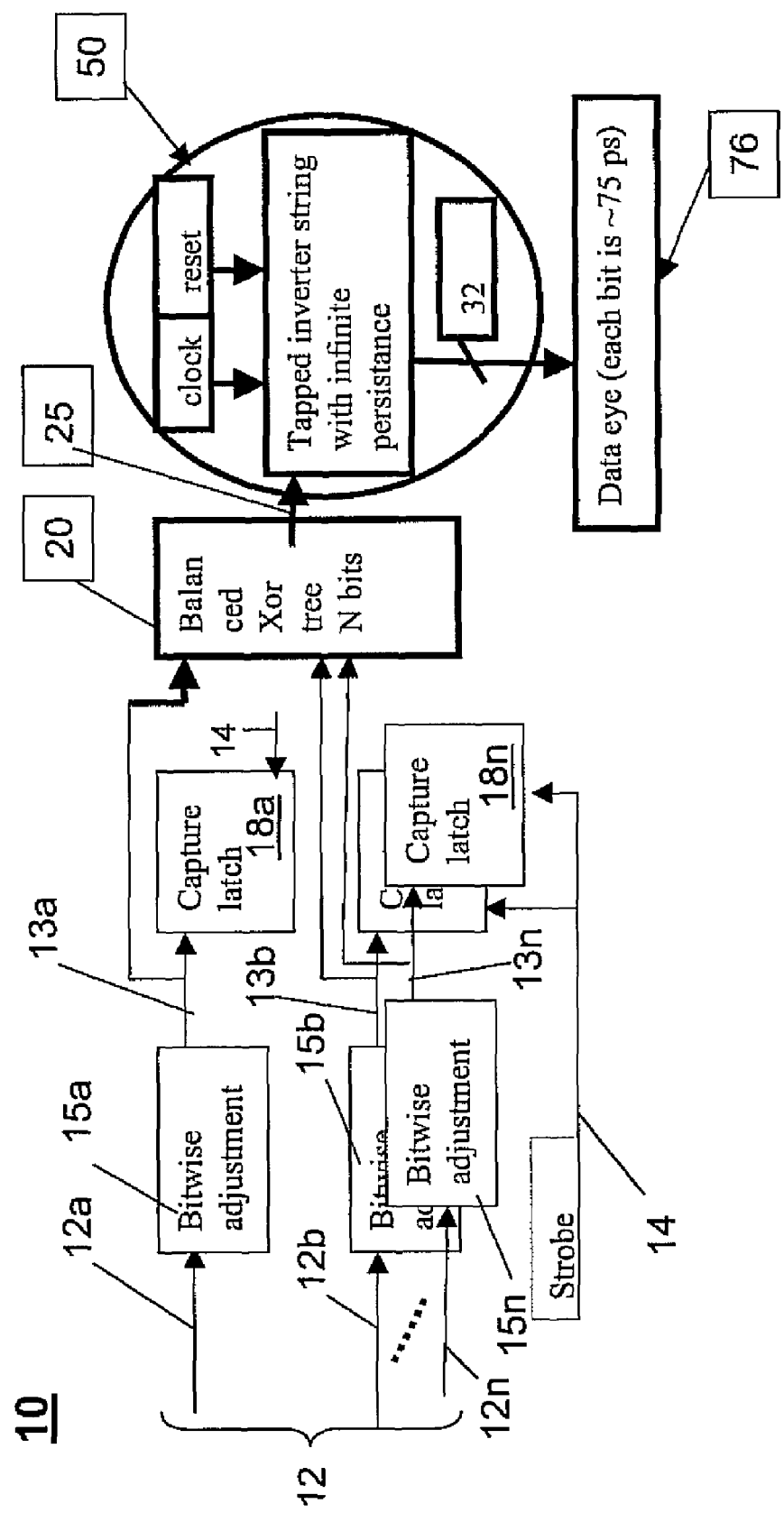
FIG. 1 depicts a data eye monitor 10 of the present invention.

FIG. 1 depicts generally an overall base architecture 10 of a DDR Data eye monitor apparatus 10 of the present invention. The DDR is advantageously employed at the data path of any digital circuit, where the digital circuit captures data signals 12 using a strobe signal 14. As known, in a typical use of a SDR DRAM, the data bits are associated with a strobe line which functions as a clock for the data bits when they are captured into the receiving circuit (e.g., integrated circuit) chip. As will be explained, the data eye monitor and methodology of the present invention provides a "persistent" data eye that can be used to adjust the input data strobe signal 14 to ensure accurate latching of the data signals at the input of a receiving data latch circuit throughout its operation.

As shown in FIG. 1, the DDR Data eye monitor apparatus 10 comprises a plurality of bit adjuster elements 15a, . . . , 15n, each bit adjuster element corresponding with a respective synchronous data bit input signal 12a, . . . 12n, which may comprise a group of data bits (e.g., n=8, n=16) provided in parallel from a data source, e.g., a memory storage device such as a DRAM or SDRAM circuit processor device, over a data bus (not shown). It is understood that data sources are not necessarily limited to memory but may comprise any device employing a high-speed source synchronous interface (implying data sources and a clock or strobe used to extract the data). Each bit adjuster elements 15a, . . . , 15n comprises the implementation of logic used to align each of the DRAM data bits. That is, bit adjuster element 15a, . . . , 15n functions to align the input data bit signals 12a, . . . 12n to form respective adjusted input data bit signals 13a, . . . 13n such that they arrive at a respective capture latch element 18a, . . . 18n at or substantially close to the same time. The logic employed by each bit adjuster elements 15a, . . . , 15n provides an adjustable delay function comprising implementation of buffers/inverters or even wire delays to provide net-length balancing, i.e., provide a bit wise adjustment to ensure adjusted input data bit signals 13a, . . . 13n arrive at each respective capture latch element 18a, . . . 18n for latching at or substantially close to the same time that the strobe signal 14 is asserted by a strobe circuit (not shown) provided by the DRAM or high-speed source synchronous interface. In one particular implementation, bitwise adjustments are performed to align the bits according to the slowest digital bit received. More particularly, each data capture latch element 18a, . . . 18n used to capture the DRAM data into the chip receives a clock (not shown) which is a delayed version of the incoming data strobe signal 14. The strobe signal is sent from the DRAM or high-speed source synchronous interface edge aligned with data and must be centered in the data window in order to correctly capture the data into the capture latch element.

As further shown in FIG. 1, each bitwise adjusted input data bit signals 13a, . . . 13n are further input to an balanced XOR tree device 20 that provides an output parity signal 25. In the context of the present invention, the balanced XOR tree device 20 represents an XOR of the incoming data and comprises a structure formed by connected gates of a similar type in which all the inputs need to pass through the same number of logic levels (not shown) to reach a single output, i.e., an output observation. The inherent characteristic of this structure is that all the inputs have the same probability of occurrence and/or are equally likely to occur on the output observation point. By using XOR gates in the balanced XOR tree structure, effectively the output signal comprises a parity signal 25 representing the parity of the group of adjusted input data bit signals 13a, . . . 13n. For instance, if the bitwise adjusted input data bit signals 13a, . . . 13n comprise an odd number of "1" level signals, then parity output signal 25 may comprise a logic 1, for example; alternately, if the bitwise adjusted input data bit signals 13a, . . . 13n comprise an even number of "1" level signals, then parity output signal 25 may comprise a logic 0. The logic handling the XOR is placed in close proximity to one another with tight tolerance throughout the tree structure. In the representation depicted, the adjusted input data bit signals 13a, . . . 13n are XOR'ed in balanced XOR tree device 20 to reduce the number of data eye circuits required. The need for a balanced tree is to guarantee that the rising and falling edges of the data eye are consistent and true.

As further shown in FIG. 1 the output parity signal 25 for the group of adjusted data bit signals is input to a tapped inverter circuit device 50 that generates the data eye output signal 75 with infinite persistence according to the invention.

Figure 2:
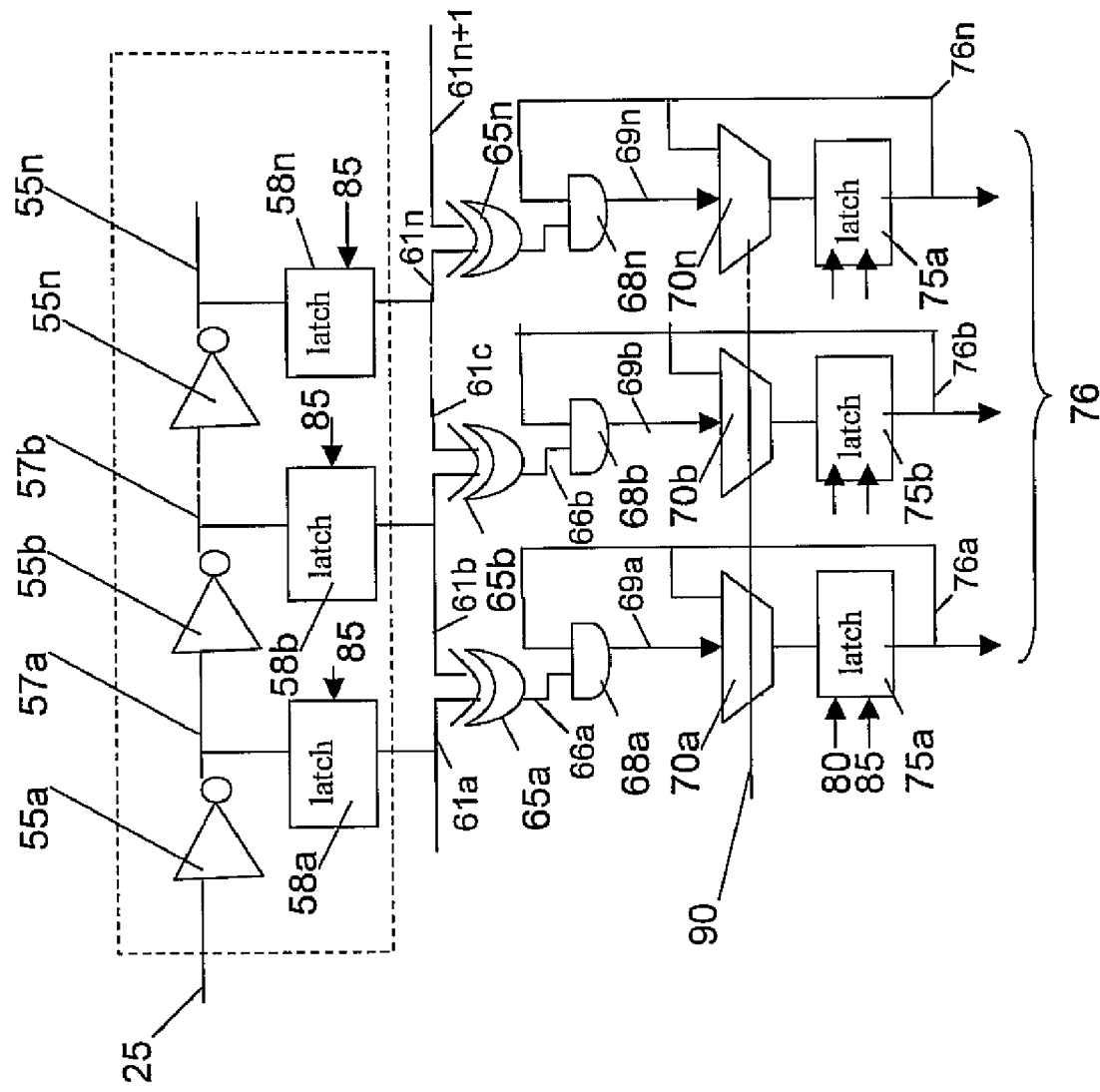
FIG. 2 shows an example detailed diagram of the inverter delay chain implementing the data eye monitor according to one embodiment of the present invention.

FIG. 2 describes the tapped inverter circuit device 50 function receiving the output parity signal 25. In one embodiment, this circuit 50 is represented as a serial connection of or chain of inverter devices 55a, . . . , 55n, each providing a fixed delay, and providing a respective output signal 57a, . . . , 57n that feeds a respective latch device 58a, . . . , 58n and the next adjacent inverter in the chain. In one example implementation, there is provided a serial connection of 32 inverter devices with respective 32 latch devices 58a, . . . , 58n, with each respective latch device receiving a clock (CLK) signal 85 for latching the data at the output of each inverter in the chain. The amount of inverter and latch devices in the chain may be configurable depending upon the total delay required to ensure data eye detection, available chip real-estate, etc. At a minimum, the length of the inverter/latch chain must be greater than the data cycle time, e.g., which may be at 425 Mbits second in an example embodiment. Preferably, the inverter and latch 58a, . . . , 58n must be placed near one another and also near to its neighbor with tight tolerance to ensure a constant, uniform and predictable delay associated with each inverter.

As shown in FIG. 2, the tapped inverter circuit device 50 delays to input parity signal 25 formed by traversing the serial chain of inverters of device 50 provides the delay mechanism to build the data eye as will be explained in greater detail herein below. In one example embodiment, the delay of each inverter 58a, . . . , 58n is approximately 75 picoseconds, and in general, each delay must be of a granularity to ensure detection of the data eye over the serially connected string of inverter devices 55a, . . . , 55n. Each respective latched result outputs 61a, . . . , 61n of the latches are XOR'd using XOR logic devices 65a . . . , 65n with the latched result of its respective adjacent inverter string (its next neighbor). For example, latched result 61a of latch device 58a is XOR'd with the latched result output 61b of its next adjacent latch device via XOR device 65a; adjacent latch outputs 61b is XOR'd with the latched result output 61c via XOR logic device 65b; adjacent latch output 61n is XOR'd with the latched result output 61n+1 via XOR logic device 65n, etc. In this manner, by delaying the signal 25, a latch device 58a, . . . , 58n will either latch the parity signal 25 or not. According to the invention, by comparing, via the respective XOR logic devices 65a, . . . , 65n, each output of two adjacent latches of the chain, the outputs 66a, . . . , 66n of the respective XOR logic devices 65a, . . . , 65n will indicate any detected signal transition. Depending upon its location in the chain, these detected signal transitions correlate to points in time from which respective front and back edges of the data eye are determined and from which a signal for adjusting the strobe signal delay may be determined.

Continuing, in FIG. 2, the respective output signals 66a, . . . , 66n of the XOR devices 65a, . . . , 65n, including those output signals representing detected signal transitions of the tapped inverter circuit device 50, are then AND'ed, by respective AND logic gates 68a, . . . , 68n, with a respective previous latched output result 76a, . . . , 76n fed back from the output of a respective multiplexer (MUX) device 70a, ..., 70n. More particularly, when a MUX enable signal 90 is asserted and present at the input of each MUX device 70a, ..., 70n, each MUX will select the AND Gate output signals 69a, ..., 69n as the new value to be latched from the output of a respective multiplexer device 70a, ..., 70n. That is, each multiplexer device is programmed to select the AND Gate output signals 69a, ..., 69n as the new value to be latched for the data eye by respective latching devices 75a, ..., 75n that represent the data eye register. The output signals 76a, ..., 76n latched by respective latching devices 75a, ..., 75n comprise the data eye window.

Thus, the MUX enable signal 90 and multiplexer devices indicate that valid data is being transferred from the DRAM in that cycle, and consequently, enables updating of the data eye latches thereby providing an infinite persistence data eye output 76. That is, The MUX allows feed-back control to load a new value when data is valid from the DRAM. If the MUX enable signal 90 is not asserted, the AND Gate output signals 69a, ..., 69n will not be latched by respective latching devices 75a, ..., 75n; rather, the prior latched signals 76a, ..., 76n from a prior cycle is fed back to the MUX will be selected by the MUX, and the data eye will not be adjusted for that cycle, i.e., the data eye register will still holds its values. In this manner the data eye may be built over time, and is updated at each valid DRAM transfer, for example, thereby providing a persistent data eye.

It is further understood, that a new data value may be written into the MUX to re-initialize the data eye window prior to its operation. That is, a reset signal 80 may be input to the latching devices 75a, ..., 75n to set their output to '1', for example, and re-start the data eye window building process.

The results of the data eye, as embodied as signals 76 output of the data eye register comprising latching devices 75a, ..., 75n can be read by software and used to control the amount of delay on the incoming strobe. For example, given an example 32 bit data eye register latch comprising latching devices 75a, ..., 75n, one example data eye window output 76 may comprise, in a first DRAM transfer cycle, the following:
0,0,0,0,1,1,1,1,1,1,1,1,1,1,1,0,0,0,0,0,0,0,0,0,0,0,0,0,0,0,0,0
and, over time, the accumulated data eye window output 76 comprises, in a subsequent cycle,
0,0,1,1,1,1,1,1,1,1,1,1,1,1,1,0,0,0,0,0,0,0,0,0,0,0,0,0,0,0,0,0

Then, assuming each bit representing a delay of about 75 picoseconds as in the example configuration presented herein, then, the data eye window, e.g. as indicated by location of the transition points of the data eye window output 76, has moved forward or "drifted" in one direction as it has been detected that the data eye window has shifted forward in time, e.g., 150 picoseconds. Thus, as in this example, if the data eye 76 appears to be earlier than anticipated, then less delay may be programmed into the strobe circuit. Continuing with this example, if, over time, the accumulated data eye window output 76 comprises, in a subsequent DRAM transfer cycle, the following:
0,0,0,0,0,0,1,1,1,1,1,1,1,1,1,1,1,0,0,0,0,0,0,0,0,0,0,0,0,0,0,0
and, assuming each bit representing a delay of 75 picoseconds as in the example design configuration presented herein, then, the data eye window, e.g. as indicated by location of the transition points of the data eye window output 76, has moved forward or "drifted" in one direction as it has been detected that the data eye window has shifted back in time, e.g., 150 picoseconds. Thus, conversely, if the data eye 76 appears to be later than anticipated, then more delay could be programmed into the strobe circuit. Controlling the strobe centering is critical to the capturing of memory storage device, e.g., DRAM data.

In sum, the inverter/latch string and set of latches are implemented to save the data eye and the circuit 10 of FIG. 1 will generate an infinite persistent data eye. Once the width of the data eye is known various actions can be taken to improve the memory interface (i.e., strobe centering can be adjusted). Actions can be performed by hardware or by a combination of software and hardware. Using this method the data eye can be monitored continuously during actual read operations and not simply during a diagnostic or power on time.

In one example implementation, for example, a programmed application may read the contents of the data eye output 76 and, for the particular application, will compare the value read with some set limits. Thus, if the value exceed some set limit in one direction, then the strobe signal may be readjusted accordingly. Thus, the eye size and position can be used to readjust the delay of incoming signals and/or to control environment parameters like voltage, clock speed and temperature, etc.

It should be understood that, in one embodiment, the data bit input signals 12a, ... 12n may comprise a group of digital bit signals (e.g., n=8, n=16) transmitted in parallel by the data source, e.g., a DRAM device. Thus, for example, there may be 160 bit input signals, e.g. 20 groups of 8 bits signals each) with a corresponding data eye monitor apparatus 10 of FIGS. 1 and 2 implemented for each group. Furthermore, a group of digital bit signals may be associated with a different DRAM or high speed source synchronous interface device having different strobe signal requirements. The apparatus 10 thus will provide the persistent data eye for each unique strobe signal corresponding to the digital bit group.

The present invention is advantageously employed for many computing system architectures. One such architecture includes the "BlueGene/P" high-performance computing system, such as available from International Business Machines Corp. (IBM) where a compute node is provided comprising an indivisible multi-processor unit, formed of System-on-Chip (SOC) technology, that includes, for example, a plurality of processors each with one or more levels of cache. In one embodiment, the present invention is implemented in a processing node of an Ultrascalable Petaflop Parallel Supercomputer architecture such as shown and described in greater detail in commonly-owned, U.S. Ser. No. 11/768,905, now U.S. Pat. No. 7,761,687, incorporated by reference herein, that comprises multiple processing nodes organized in one form, as a three-dimensional torus interconnected and designed to deliver processing power on the order of a petaflops (a quadrillion floating-point operations per second) for a wide range of applications. In an exemplary embodiment, the Massively Parallel Supercomputer architecture comprises 72K processing nodes organized as a 72×32×32 with each compute node being connected to six (6) neighboring nodes via 6 bi-directional torus links.

Figure 3:
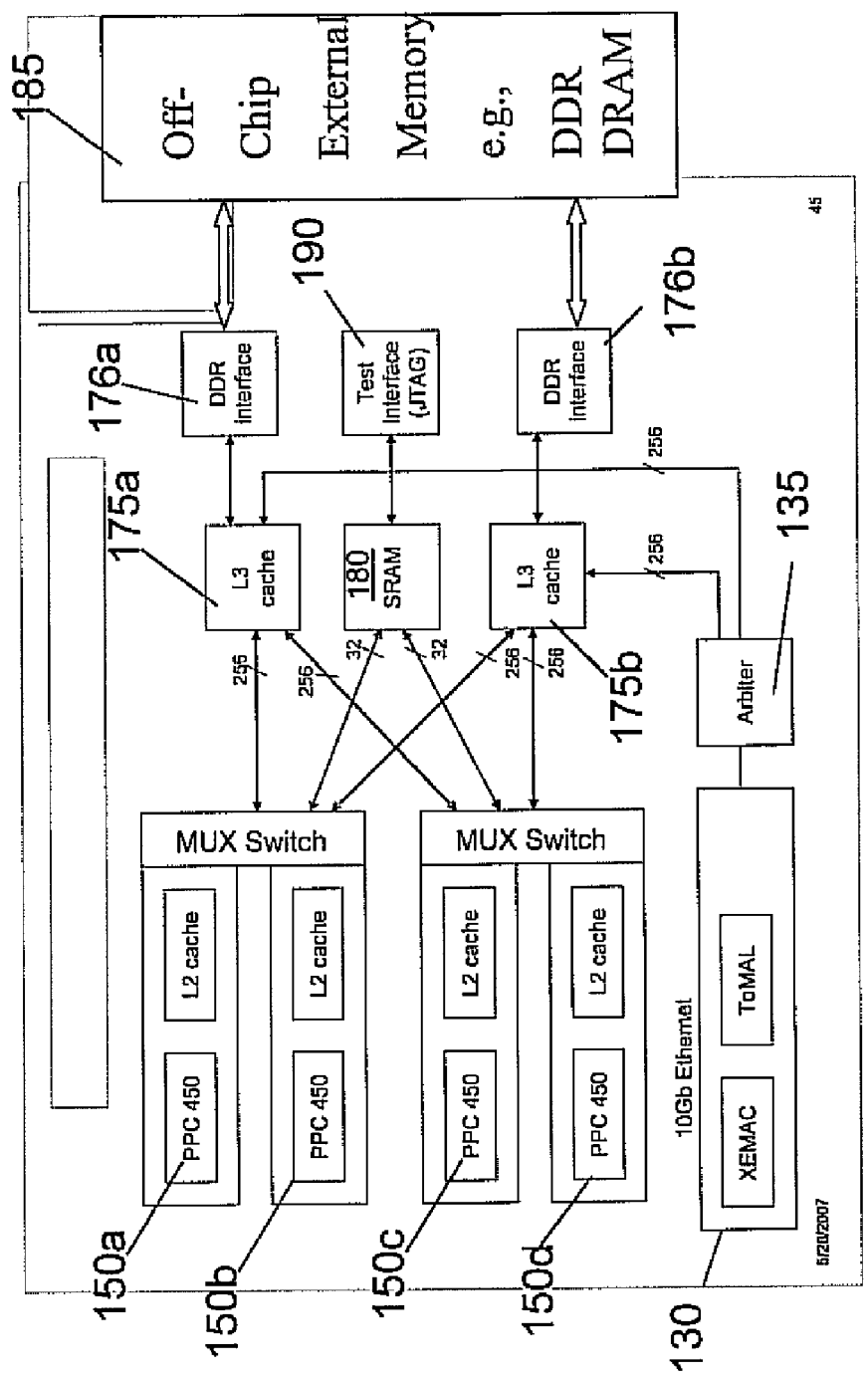
FIG. 3 depicts a high level schematic diagram illustrating a single computing node ASIC 100 in which the present invention may be employed.

FIG. 3 particularly illustrates a block diagram depicting a single computing node ASIC 100 in which the present invention may be employed. Each node preferably is based on the chip process that integrates all the functions of a computer into a single compute ASIC, enabling dramatic reduction of node size and power consumption. In a supercomputer, this can be further leveraged to increase node density thereby decreasing the overall cost/performance for the machine. As shown in FIG. 3, the ASIC of this design, which may function as both a compute node and an I/O node in the system, include four processing cores, e.g., cores 140a, ... 140d, each having a "double" floating point unit (not shown), that may include two coupled standard floating point units. This arrangement gives a peak performance of four floating point operations per processor core per clock cycle. The processor core, in one embodiment, is a PowerPC450 embedded core available from IBM microelectronics, although future versions of this core may be used as technology improves. The "Double" FPU unit increases the data bandwidth by increasing the datapath from 64 bits to 128 bits to allow for quadword Floating Point loads and stores (i.e., data moving).

As shown in FIG. 3, the node 100 further incorporates other functions into the ASIC. Besides the embedded processing core and floating point cores, the system includes embedded DRAM 175a, 175b an integrated external DDR2 memory controller, DMA (not shown), 10 Gb Ethernet functionality as well as network link cut-through routing buffers and routing control block that allow any two nodes to communicate with low latency. The compute node particularly includes four embedded cores, such as the PPC450, each capable of being utilized for message handling and computation operations.

Also included in a node 100 is a Scratch SRAM 180, provided to serve as a background communication mechanism with a host system (not shown). All four cores have equal access to the SRAM which is critical for the independent exchange of messages between each core and the host system. The size of the Scratch SRAM may range on the order of 32 KB-128 KB.

Further in FIG. 3, there is additionally provided two DDR-2 controllers 176a,b that enable use of the low cost commodity DDR-2 external memory 185. As mentioned, the latency to this external memory is one of the critical design parameters and different memory configurations may be supported with the internal DDR-2 controller thereby allowing many system memory configurations. Thus, in an example implementation, each of the two DDR-2 controllers 176a,b provided in node 100 may employ the data eye monitor 10 of the invention.

In a preferred embodiment, the same compute node ASIC may be used as an I/O node which is associated with a subset of the compute nodes (16, 32, 64, or 128 compute nodes), for handling fileserver communication and I/O operations. That is, the I/O nodes are identical to the compute nodes. The only difference is that an I/O node enables and uses an external network interface 430, such as a 10 Gigabit Ethernet. It is understood that the compute ASIC nodes may have the integrated 10 Gb Ethernet. The 10 Gb Ethernet functional units (XEMAC, ToMAL) interfaces to an arbiter 135 which arbitrates inputs to L3 level cache from torus DMA and from 10 Gb Ethernet. This allows the processor within a node to set up a transfer and return to handling messages with very little overhead.

The node ASIC additionally includes the functionality necessary to boot, debug and support RAS (reliability, availability and serviceability). On the ASIC, this functionality is provided by an extension of the IEEE1149.1-1993 standard, also known as the JTAG standard. As in the predecessor system described in applicants commonly-owned, co-pending International Patent application PCT/JUS02/05571 filed Feb. 25, 2002 entitled "A Novel Massively Parallel Supercomputer, extensive use is made of these JTAG TDRs for chip self test functions, for boot code loading, for chip configuration and control, for monitoring and for debug. In particular, each of the PPC450 cores has a slave JTAG interface 490 that can be used with the IBM RiscWatch™ software for detailed debug operations of each PPC450 core.

From a full system perspective, the supercomputer as a whole is controlled by a Service Node (not shown), which is the external computer that controls power-up of the machine, partitioning, boot-up, program load, monitoring, and debug. The Service Node runs the Control System software. The Service Node communicates with the supercomputer via a dedicated, private 1 Gb/s Ethernet connection (not shown).

More particularly, with respect to the compute node memory system, there is included an on-chip cache hierarchy, an off-chip main store, and optimized on-chip support for locking and communication between the four ASIC processor cores 140a, . . . , 140d. The memory system is architected for peak performance over a range of target applications. The aggregate memory of the machine is completely distributed in the style of a multi-computer, with no hardware sharing between nodes. Each node may own, for example, 2 gigabytes of physical memory, resulting in a total of 144 terabytes in a 72 K-node system. As shown in FIG. 3, the physical memory of the node is shared by the four processors within the ASIC, and the hardware provides optional coherence support.

Although not shown in FIG. 3, each processor core includes a first-level L1 cache comprising an instruction cache (L1 I-cache) and a data cache (L1 D-Cache), which are each both part of the 450 core macro. The data cache produces two separate 128-bit data buses to and from L2, one for reading and one for writing. Unlike the previous generation, the PowerPC 450 core provides hardware support for cache coherence for write-invalidate cache coherence protocol for multicore coherence. The nodal memory system additionally includes a main store (not shown) that may comprise double-data rate (DDR2) DRAM. It is built from commodity double-data rate synchronous DRAM (SDRAM DDR-2) devices and which may be external to the node ASIC.

FIG. 3 further depicts the overall architecture of L2 and L3. Second-level L2 cache is relatively smaller and basically serve as a prefetch and write-back buffers for the ird-level (L3) cache which is larger. In one embodiment, multiplexer (i.e., switches 131,a, 131b connect four (4) L2 level caches to two (2) memory banks of L3 at 4 MB capacity each. L3 is shared by instructions and data, and provides high-bandwidth, low-power access to the working set of most applications. The L3, being integrated on the SOC, has higher bandwidth and shorter latency, and it greatly eases the memory wall problem.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. An apparatus for tracking a data eye window of a capture device receiving a plurality of data bit signals to be captured from a memory storage device, said capture device further receiving a strobe signal for latching the plurality of data bit signals at said capture device, said apparatus comprising:
   a balanced tree network comprising a plurality of inputs, each of the inputs for receiving at least one of said data bit signals input from the memory storage device in coordination with said strobe signal, the balanced tree network generating an output signal associated with said plurality of data bit signals; and
   a tapped inverter chain receiving said output signal for generating a persistent data eye signal;
   wherein said persistent data eye signal is used to adjust said strobe signal associated with data eye centering of said capture device;
   wherein said tapped inverter chain comprises:
   a serial connection of n number of inverter devices, each of the inverter devices providing a fixed delay time interval, and each of the inverter devices providing a respective output signal;
   n number of latch devices, each latch device being associated with a respective inverter device for latching a respective output signal from each of the inverter devices; and n-1 number of comparison devices, each comparison device receiving a respective latched output signal from one of the latch devices, each comparison device receiving a latched output signal of a next latch device, and each comparison device determining a presence or an absence of a transition at a delay element interval resolution;

wherein n is an integer greater than 1.

2. The apparatus as claimed in claim 1, wherein said balanced tree network is an XOR network, said output signal comprising a parity signal associated with said plurality of data bit signals in a memory storage transfer cycle.

3. The apparatus as claimed in claim 1, further comprising:
signal adjust means for first receiving said plurality of data bit signals and aligning one or more of said plurality of data bit signals according to a slowest received data bit signal prior to input to said balanced tree network.

4. The apparatus as claimed in claim 1, further comprising:
means associated with each respective comparison device for latching an output of each respective comparison device, said persistent data eye signal represented as a series of latched data bits output from said tapped inverter chain.

5. The apparatus as claimed in claim 1, wherein each tap along said tapped inverter chain represents a time accumulation for building said persistent data eye signal, a location of a transition present along said tapped inverter chain indicating an edge of said data eye window.

6. The apparatus as claimed in claim 5, wherein movement of the location of the transition along said tapped inverter chain indicates a time shift relative to a centered data eye position, said apparatus further comprising means for adjusting said strobe signal in accordance with said time shift.

7. The apparatus as claimed in claim 4, wherein said means associated with each respective comparison device for latching an output of each respective comparison device further comprises a register device accessible by a programmed processor device adapted for accessing said latched data bits output of said persistent data eye signal and initiating adjustment of said strobe signal.

8. The apparatus as claimed in claim 5, wherein said persistent data eye signal is updated every valid data transfer cycle.

9. The apparatus as claimed in claim 5, further including means for resetting building of the data eye signal.

10. The apparatus as claimed in claim 9, wherein said memory storage device is one or more of a DRAM device or other source synchronous interface device.

11. A method for tracking a data eye window of a capture device receiving a plurality of data bit signals to be captured from a memory storage device, said capture device further receiving a strobe signal for latching the plurality of data bit signals at said capture device, said method comprising:
receiving, at a balanced tree network, each of the plurality of data bit signals comprising data bits input from the memory storage device, and generating an output signal associated with said plurality of data bit signals;
implementing a tapped inverter chain responsive to said output signal for generating a persistent data eye signal; and
adjusting said strobe signal associated with data eye centering in accordance with said persistent data eye signal;
wherein said tapped inverter chain comprises:
a serial connection of n number of inverter devices, each of the inverter devices providing a fixed delay time interval, and each of the inverter devices providing a respective output signal;
n number of latch devices, each latch device being associated with a respective inverter device for latching a respective output signal from each of the inverter devices; and
n-1 number of comparison devices, each comparison device receiving a respective latched output signal from one of the latch devices, each comparison device receiving a latched output signal of a next latch device, and each comparison device determining a presence or an absence of a transition at a delay element interval resolution;

wherein n is an integer greater than 1.

12. The method as claimed in claim 11, further comprising, prior to said receiving step, a step of: aligning one or more of said plurality of data bit signals according to a slowest received data bit signal prior to input to said balanced tree network.

13. The method as claimed in claim 11, further comprising:
latching an output of each respective comparison device, said persistent data eye signal represented as a series of latched data bits output from said tapped inverter chain.

14. The method as claimed in claim 11, wherein each tap along said tapped inverter chain represents a time accumulation for building said persistent data eye signal, said method further comprising:
locating a transition present along said tapped inverter chain, said transition indicating an edge of said data eye window.

15. The method as claimed in claim 14, further comprising:
detecting movement of the location of the transition along said tapped inverter chain for indicating a persistent data eye signal time shift relative to a centered data eye position; and
adjusting said strobe signal in accordance with said time shift.

16. The method as claimed in claim 14, further comprising:
updating said persistent data eye signal every valid data transfer cycle.

17. The method as claimed in claim 14, further comprising:
resetting building of the data eye window.

18. A computer program storage device, readable by machine, tangibly embodying a program of instructions executable by a machine to perform method steps for tracking a data eye window of a capture device receiving a plurality of data bit signals to be captured from a memory storage device, said capture device further receiving a strobe signal for latching the plurality of data bit signals at said capture device, said method steps comprising:
receiving, at a balanced tree network, each of the plurality of data bit signals comprising data bits input from the memory storage device, and generating an output signal associated with said plurality of data bit signals;
implementing a tapped inverter chain responsive to said output signal for generating a persistent data eye signal; and
adjusting said strobe signal associated with data eye centering in accordance with said persistent data eye signal;
wherein said tapped inverter chain comprises:
a serial connection of n number of inverter devices, each of the inverter devices providing a fixed delay time interval, and each of the inverter devices providing a respective output signal;
n number of latch devices, each latch device being associated with a respective inverter device for latching a respective output signal from each of the inverter devices; and n-1 number of comparison devices, each comparison device receiving a respective latched output signal from one of the latch devices, each comparison device receiving a latched output signal of a next latch device, and each comparison device determining a presence or an absence of a transition at a delay element interval resolution;

wherein n is an integer greater than 1.

19. The program storage device readable by a machine as claimed in claim 18, further comprising:

latching an output of each respective comparison device, said persistent data eye signal represented as a series of latched data bits output from said tapped inverter chain.

20. The program storage device readable by a machine as claimed in claim 18, wherein each tap along said tapped inverter chain represents a time accumulation for building said persistent data eye signal, said method steps further comprising:

locating a transition present along said tapped inverter chain, said transition indicating an edge of said data eye window.

21. The program storage device readable by a machine as claimed in claim 20, further comprising:

detecting movement of the location of the transition along said tapped inverter chain for indicating a persistent data eye signal time shift relative to a centered data eye position; and adjusting said strobe signal in accordance with said time shift.

22. The program storage device readable by a machine as claimed in claim 18, further comprising, prior to said receiving step, a step of:

aligning one or more of said plurality of data bit signals to ensure alignment with a slowest received data bit signal prior to input to said balanced tree network.

* * * * *